United States Patent Office 3,836,489
Patented Sept. 17, 1974

3,836,489
ORGANOPOLYSILOXANE COMPOSITIONS
Michel Bargain, Lyon, France, assignor to
Rhone-Poulenc S.A., Paris, France
No Drawing. Filed Feb. 20, 1973, Ser. No. 333,449
Claims priority, application France, Feb. 21, 1972,
7205745
Int. Cl. C08f 19/14
U.S. Cl. 260—18 S                                    14 Claims

ABSTRACT OF THE DISCLOSURE

An organopolysiloxane composition convertible on curing to an elastomer with good heat and fire resistance, comprising an organopolysiloxane rubber, a silica filler, an organic peroxide, a platinum additive, pyrogenic titanium dioxide and 0.01 to 2 parts (per 100 parts of rubber) of zinc oxide, aluminium oxide, magnesium oxide or stannic oxide.

---

This invention relates to organopolysiloxane compositions which, after curing, can be converted into elastomers which, in the cured state, possess improved properties of incombustibility.

It is known that organopolysiloxane elastomers have good heat resistance, and that their resistance to combustion, which is greater than that of conventional elastomers, has caused them to be used for obvious safety reasons in industries such as the aeronautical and marine industries. However, since this resistance to combustion is not always sufficient, it has been recommended to incorporate in addition into the elastomers small proportions of platinum, to which there may optionally have been added minor proportions of various compounds, which act synergistically with the platinum on the resistance to combustion. Such compositions have increased fire-resistance and make it possible for electrical equipment containing cables sheathed with the composition to function even after short exposure to fire. Such compositions are, for example, described in French Pats. 1,486,530 and 1,489,621 and in Belgian Pats. 753,483 and 753,547. In particular, it has been recommended in Belgian Pat. 753,547 to add, to the platinum, titanium dioxide obtained by combustion and having a particle size less than 0.1 micron.

The present invention provides an organopolysiloxane composition convertible on curing to an elastomer which composition comprises (in parts by weight)

(a) 100 parts of an organopolysiloxane rubber of viscosity $2 \times 10^6$ to $80 \times 10^6$ centipoises measured at 25°, the organopolysiloxane being free from hydrogen atoms bonded directly to silicon atoms and being essentially formed by repetition of diorganosiloxy units, the organic radicals, which are bonded directly to the silicon atoms being alkyl, alkenyl, aromatic hydrocarbon, haloalkyl, haloalkenyl or haloaromatic hydrocarbon radicals (the proportion by weight of aromatic radicals being at most 50% of all of the organic radicals and the proportion by weight of alkenyl groups being at most 2% of the weight of the organopolysiloxane rubber),
(b) 5 to 100 parts of a finely divided inorganic filler based on silica,
(c) 0.1 to 10 parts of an organic peroxide,
(d) $10 \times 10^{-4}$ to $150 \times 10^{-4}$ parts of an additive comprising platinum (expressed as elemental platinum),
(e) 0.5 to 10 parts of a pyrogenic titanium dioxide with an average particle diameter of less than 0.1 micron, and
(f) 0.01 to 2 parts of metal oxide, which is zinc oxide (ZnO), aluminium oxide ($Al_2O_3$), magnesium oxide (MgO) or tin oxide ($SnO_2$).

The alkenyl radicals, which may be present in the organopolysiloxane rubber, are usually vinyl or allyl radicals.

The additive comprising platinum may be introduced either in the form of the metal in the supported or unsupported state, or in the form of soluble compound or complex.

The organopolysiloxane rubbers are well known to those skilled in the art and are described, for example, in French Pats. 1,329,088, 1,382,285 and 1,451,269. They usually essentially consist of one or more diorganopolysiloxanes, which may be identical or different, and which have the formula:

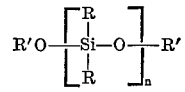

in which the symbols R represent methyl, vinyl or trifluoropropyl radicals or phenyl, dichlorophenyl, trichlorophenyl or tetrachlorophenyl radicals, and wherein the symbols R' represent a hydrogen atom or a $SiR_3$ radical, R having the above meaning. $n$ has a value which is sufficiently high, and is generally between 1,000 and 20,000, for the resultant viscosity of the rubber to be within the range defined above.

The organopolysiloxane rubbers, which are generally obtained by cohydrolysis or by polymerisation of various cyclic or linear monomers, can contain a relatively minor proportion of trifunctional groups of the type:

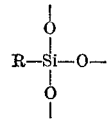

R having the above meaning; this proportion of trifunctional groups is generally not greater than 0.1% (expressed as the proportion of silicon atoms present in a trifunctional group relative to the total of all the silicon atoms).

Preferably, an organopolysiloxane rubber is used which is essentially based on diorganopolysiloxanes and does not contain a proportion of trifunctional groups greater than 0.1% and has, as the organic groups, methyl radicals and optionally vinyl and/or phenyl radicals, the proportion by weight of vinyl groups being less than 2% and the proportion of phenyl groups being less than 50%.

The finely divided silica, which plays the role of filler for the organopolysiloxane composition can be a pyrogenic silica with a large specific surface area or a precipitated silica also with a large specific surface area. In order to improve the reinforcing power of the silica, it is particularly recommended to treat it with an organo silicon compound such as octamethylcyclotetrasiloxane or with hexamethyldisilazane. The average diameter of the silica particles is generally between one millimicron and 0.1 micron. The amount of silica added is such that it imparts sufficient hardness to the elastomer.

The organic peroxide is one of the conventional peroxides which are employed for vulcanising silicone rubbers to form elastomers. Examples of such peroxides, which can be used, either alone or as a mixture, are cumyl peroxide, benzoyl peroxide, tertiary butyl perbenzoate, 2,4-dichloro-benzoyl peroxide, di-(tertiary butyl) peroxide, tertiary butyl percarbonate and isopropyl percarbonate. The peroxide can be introduced directly or in the form of a paste in a diorganopolysiloxane oil of sufficient viscosity.

Platinum is present to the extent of 10 to 150 p.p.m. and preferably to the extent of 20 to 100 p.p.m. It can be introduced in any form which can be incorporated uniformly with the other constituents of the organopolysiloxane composition. It is thus possible to introduce platinum metal in the finely divided state or platinum metal deposited on an inert support such as silica or calcium carbonate. However, it is preferable that the platinum be supplied in the organo polysiloxane composition in the form of compounds which may be brought into solutions in suitable solvents. Soluble compounds of platinum include chloroplatinic acid, complexes of platinous chloride with phosphines, aminophosphines or nitriles, and complexes of platinous halides with olefines, alcohols, ethers or aldehydes. Amongst the platinum complexes, the compounds of the following formula may be mentioned by way of illustration:

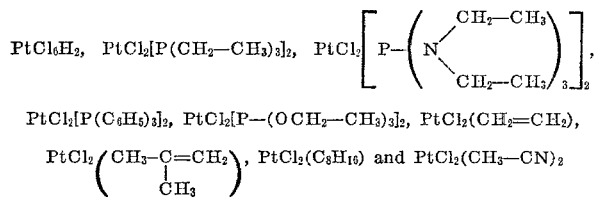

The complexes of a platinum halide with alcohols, aldehydes and ethers are, for example, described in French Pat. 1,367,044.

Other fillers and various adjuvants, such as anti-structure agents, heat stabilisers, and pigments, can also be incorporated into the composition according to the invention.

The anti-structure agents, also known by the name of plasticisers, are generally of an organosilicon nature and are usually introduced in an amount of 0 to 20 parts per 100 parts of organosilicon rubber. They make it possible to prevent the compositions from curing during storage. Examples of the anti-structure agents are silanes possessing hydrolysable groups or hydroxylic or alkylated diorganopolysiloxane oils of low molecular weight. Such compositions are, for example, described in French Pat. 1,111,969.

Amongst the heat stabilisers which are well known to those skilled in the art, are iron, cerium or manganese salts e.g. iron octanoate, oxides and hydroxides. These additives, which can be used either alone or as a mixture, are generally introduced in an amount of 0.01 to 5% relative to the weight of the organopolysiloxane rubber employed.

In order to prepare the compositions of the invention the various components are intimately mixed by means of devices which are well known in the rubber industry, it being possible to incorporate them in any order. It is obvious that the solid fillers must be introduced in the form of a very fine powder, the particle size being generally less than 50 microns. However, it is preferable, in a first stage, to disperse the fillers and the pigments in the rubber, and then to add the plasticisers, stabilisers and peroxides in that order. The desired amounts of platinum, titanium dioxide and metal oxides are then introduced into these mixtures. In order to make it easier to obtain a homogeneous composition, the compounds, which have to be incorporated in small proportions, are first mixed with a diorganopolysiloxane rubber in order to obtain a homogeneous and unctuous paste.

The compositions can be vulcanised by heating under pressure in air at temperatures ranging from 100 to 300° C., the duration of vulcanisation varying, depending on the temperature to which the composition is heated. When the vulcanisation is complete, it is preferable to follow it with a re-heating at 200–250° C. so as to impart better heat resistance to the elastic products obtained.

The compositions according to the invention possess improved resistance to combustion, whilst simultaneously possessing good mechanical properties. It was found that the elastomers retained their properties of incombustibility, without noticeable deterioration, when they were exposed for a long time to a humid atmosphere. Moreover, it was observed that exposure of the elastomers to a high temperature did not reduce the resistance to combustion.

In the Specification of Ser. No. 321,307 (A/20168) filed Jan. 5, 1973 by Gerard Milbert is described and claimed an organopolysiloxane composition comprising by weight:

(a) 100 parts of at least one diorganopolysiloxane rubber of viscosity 2 million to 80 million centipoises at 25° C., consisting essentially of diorganosiloxyl units and blocked at each end of the polymer chain by a triorganosiloxyl, hydroxyl or alkoxy group of 1 to 4 carbon atoms, each organic radical bonded to a silicon atom being an alkyl, halogenalkyl, vinyl, aryl or halogenoaryl radical, at least 50% of these organic radicals being methyl radicals, (b) 5 to 100 parts of at least one inorganic filler, which may be silica, (c) 0.2 to 5 parts of an organic peroxide, (d) 0.001 to 0.01 part of an additive comprising platinum (expressed as elemental platinum) and (e) either 3 to 35 parts in total of at least one rare earth metal oxide, which may be cerium oxide or 1 to 8 parts in total of at least one rare earth metal hydroxide.

In the Specification of Ser. No. 333,450 (A/20408) filed Feb. 20, 1973 by Michel Bargain is described and claimed an organopolysiloxane composition convertible on curing, to an elastomer, which composition comprises (in parts by weight):

(a) 100 parts of an organopolysiloxane rubber of viscosity $2 \times 10^6$ to $80 \times 10^6$ centipoises measured at 25°, the organopolysiloxane being free from hydrogen atoms bonded directly to silicon atoms and is essentially formed by repetition of diorganosiloxy units, the organic radicals which are bonded directly to the silicon atoms, being alkyl, alkenyl, aromatic hydrocarbon, haloalkyl, haloalkenyl or haloaromatic hydrocarbon radicals (the proportion by weight of aromatic radicals being at most 50% of all of the organic radicals and the proportion by weight of alkenyl groups being at most 2% of the weight of the organopolysiloxane rubber)

(b) 5 to 100 parts of a finely divided inorganic filler based on silica, (c) 0.1 to 10 parts of an organic peroxide and (d) $10 \times 10^{-4}$ to $150 \times 10^{-4}$ parts of an additive comprising platinum (expressed as elemental platinum) and (e) 0.5 to 25 parts of magnesium oxide MgO.

In the following Examples the resistance to combustion is demonstrated by means of two standardised tests. The first is that of the Bureau de Normalisation de l'Aeronautique et de l-Espace (Aeronautics and Space Standards Institute) (BNAE; Standard Specification NFL 17,101 A). It consists of placing the sample of elastomer (of dimensions 14 x 7 x 0.2 cm.), hold in the vertical position by being fixed between two metal frames, in such a way that the middle of the lower edge of the elastomer is situated 19 mm. from the end of the chimney of a Bunsen burner. The flame is adjusted to be at a height of 3.8 cm. and a temperature of the order of 800–845° C., and is kept in contact with the sheet of elastomer for 12 seconds. The flame is removed and the period of time during which the sheet continues to burn or remains incandescent is determined.

The second test, which makes it possible to demonstrate the improvement in the resistance to combustion, is defined in Standard Specification ASTM D 2863–70. It consists of burning a sample of elastomer in a stream of gas consisting of a mixture of oxygen and nitrogen, in varying proportions, and of determining the limiting oxygen index (LOI) which is the value of the ratio $$\frac{\text{flow rate of } O_2}{\text{flow rate of } O_2 + \text{flow rate of } N_2}$$

which enables either the combustion to be propagated over a maximum length of 5 cm. or the combustion to last for a maximum of 3 minutes.

The Examples which follow illustrate the invention; temperatures are in degrees centigrade.

EXAMPLE 1

225 g. of a polydimethylsiloxane rubber (containing 720 mg. of vinyl groups per kg; this rubber is terminated by trimethylsiloxy units and has a viscosity of $20 \times 10^6$ centipoises at 25°), 96.6 g. of a pyrogenic silica which has been treated with octamethylcyclotetrasiloxane (specific surface area 300 m.²/g.), 0.9 g. of a heat stabilizer consisting of iron octanoate in polydimethyl siloxane. [This paste of iron octanoate contains 5.65 mg. of iron (in form of iron octanoate) per g. 3.94 g. of an anti-structure agent ($\alpha,\omega$-dihydroxylic dimethylpolysiloxane oil; viscosity at 25°: 40 centipoises; OH content: 1.3 g./100 g.), 12.2 g. of pyrogenic titanium dioxide of particle size less than 0.1 micron and 4.16 g. of a paste of 2,4-dichloro-benzoyl peroxide dispersed in an organopolysiloxane rubber (total peroxide content: 2.08 g.) are homogenised for 15 minutes on a roll mill.

To this homogeneous mixture, which will be denoted by the term "mixture (A)," there are added 1.7 g. of pyrogenic zinc oxide of particle size less than 50 microns and 4.88 g. of a paste containing 0.0238 g. of chloroplatinic acid hexahydrate dispersed in an organopolysiloxane rubber.

A part of the composition is then removed and placed in 4 parallelepiped shaped moulds of dimensions 15 x 15 x 0.2 cm., which have first been heated to 115°, and a pressure of 150 kg./cm.² is applied for 15 minutes.

The sheets are removed from the mould and re-heated for 16 hours at 200° and then for 16 hours at 250°. They have the following properties:

LOI index: 33.6
Duration of combustion in the BNAE test (Standard Specification NFL 17101/A): 4 seconds
Shore hardness A: 6–1 (Standard Specification ASTM D 676)
Tensile breaking strength: 685 kg./cm.²
Elongation at break: 270%
Tear strength: 17 kg./cm.

By way of comparison, an identical composition, but one which did not contain zinc oxide, was prepared. The elastomers, cured in the same way, possess the following properties:

LOI index: 29.5
Duration of combustion in the BNAE test: 32 seconds

When these values are compared with those given above, they show the substantial improvement in the resistance to combustion provided by the use of zinc oxide.

EXAMPLE 2

An identical composition to that of Example 1 is prepared, restricting the amount of zinc oxide to 0.17 g. After homogenisation, vulcanisation and re-heating, sheets of elastomers are obtained, the properties of which are as follows:

LOI index: 33.3
Duration of combustion in the BNAE test: 5 seconds
Shore hardness A: 61
Tensile breaking strength: 64 kg./cm.²
Elongation at break: 270%
Tear strength: 16.5 kg./cm.

EXAMPLE 3

A homogeneous mixture, consisting of 337 g. of a polydimethylsiloxane rubber (described in Example 1), 145 g. of pyrogenic silica of the "Aerosil" type which has been treated with octamethylcyclotetrasiloxane, 1.35 g. of a paste of iron octanoate in polyodimethyl siloxane (described in Example 1) as a heat stabiliser, 5.90 g. of antistructure agent (similar to that of Example 1), 18.3 g. of pyrogenic titanium oxide and 5.12 g. of zinc oxide is prepared.

170 g. of this mixture are removed and malaxated for 10 minutes with 2.44 g. of a chloroplatinic acid paste (paste described in Example 1), and then 2.2 g. of a paste of 2,4-dichloro-benzoyl peroxide (paste described in Example 1), are added and malaxating is continued for 10 minutes.

After vulcanisation, the elastomer sheets are re-heated for 16 hours at 200° and then for 16 hours at 250°. The properties are as follows:

LOI index: 34.6
Duration of combustion in the BNAE test: 5 seconds
Shore hardness A: 64
Tensile breaking strength: 73 kg./cm.²
Elongation at break: 290%
Tear strength: 14.2 kg./cm.

EXAMPLE 4

A homogeneous mixture (A), as described in Example 1, is prepared and 0.342 g. of zinc oxide is introduced into it. 170 g. of the mixture are then removed, 1.2 g. of a paste of chloroplatinic acid (described in Example 1) are added and the moulding, vulcanisation and re-heating treatments are carried out.

The sheets of elastomers have the following properties:

LOI index: 33.2
Duration of combustion in the BNAE test: 4 seconds
Shore hardness: 64
Tensile breaking strength: 86.3 kg./cm.²
Elongation at break: 404%
Tear strength: 19.3 kg./cm.

EXAMPLE 5

A mixture consisting of 337 g. of polydimethylsiloxane rubber (described in Example 1), 140 g. of pyrogenic silica of the "Aerosil" type which has been treated with octamethylcyclotetrasiloxane, 1.35 g. of a paste of iron octanoate in dimethylpolysiloxane as a heat stabiliser (described in Example 1), 5.90 g. of an anti-structure agent (described in Example 1), 3.15 g. of cerium oxide of particle size less than 50 microns, 18.45 g. of pyrogenic titanium dioxide and 0.525 g. of zinc oxide is malaxated in a roll mill.

169 g. of this mixture are removed and 2.44 g. of a paste of chloroplatinic acid are added; the whole is malaxated for 30 minutes and then 2.2 g. of the peroxide paste described in Example 1 are added and the mixture is malaxated again for 130 minutes. After moulding, vulcanisation and re-heating for 16 hours at 200°, cured products, the LOI index of which is 34.2, are obtained.

Sheets of elastomers are prepared in an identical manner, but are subjected to a re-heating treatment of 16 hours at 200° followed by 16 hours at 250°. The properties of the elastomers are then as follows:

LOI index: 34.9
Duration of combustion in the BNAE test: 4 seconds
Shore hardness A: 64
Tensile breaking strength: 72 kg./cm.²
Elongation at break: 295%
Tear strength: 13 kg./cm.

Sheets are prepared in accordance with the process described above and are exposed to moisture for 72 hours (relative humidity RH: 100%). It is found that the duration of combustion in the BNAE test is 6 seconds.

These results illustrate well that the improved properties of incombustibility are not affected to any substantial extent by prolonged exposure to heat or moisture.

EXAMPLE 6

A mixture (A) is prepared as in Example 1 and 1.88 cm.³ of a solution of an octyl alcohol/chloroplatinic acid complex containing 4.83 mg. of platinum per cm.$^3$ of solution and prepared in accordance with the technique described in French Pat. 1,367,044, are incorporated into it.

170 g. of this mixture are removed and 0.34 of calcinated magnesia (particle size less than 50 microns) is incorporated into it in a homogeneous manner. After the usual treatments, sheets of elastomers are obtained, the properties of which are as follows:

LOI index: 33.1
Duration of combustion in the BNAE test: 4 seconds
Shore hardness A: 63
Tensile breaking strength: 73 kg./cm.$^2$
Elongation at break: 290%
Tear strength: 15.6 kg./cm.

EXAMPLE 7

A mixture (A) is prepared as in Example 1, 170 g. of it are removed and malaxated for 15 minutes together with 2.44 g. of paste of chloroplatinic acid (described in Example 1); 0.34 g. of calcined alumina of particle size less than 50 microns is then added and malaxating is continued for 10 minutes.

After vulcanisation, the sheets of elastomers are reheated for 16 hours at 200° and then for 16 hours at 250°.
The properties are as follows:

LOI index: 33.1
Duration of combustion in the BNAE test: 4 seconds
Shore hardness A: 63
Tensile breaking strength: 73 kg./cm.$^2$
Elongation at break: 290%
Tear strength: 15.5 kg./cm.

EXAMPLE 8

A mixture consisting of 225 g. of an organopolysiloxane rubber (described in Example 1), 96.3 g. of pyrogenic silica of the "Aerosil" type which has been treated with octamethylcyclotetrasiloxane, 0.9 g. of a paste of iron octanoate in polydimethylsiloxane as a heat stabiliser (described in example 1), 3.94 g. of an anti-structure agent, 12.3 g. of pyrogenic titanium oxide, 2.10 g. of cerium oxide, 4.88 g. of a paste of chloroplatinic acid (described in Example 1) and 4.4 g. of a 50% peroxide paste (described in Example 1) is malaxated for 15 minutes on a roll mill.

0.34 g. of tin oxide $SnO_2$ (particle size less than 40$\mu$) is added to the homogeneous mixture and the whole is malaxated for 10 minutes. Sheets of elastomers are prepared in accordance with the processes described above. These sheets have the following properties:

LOI index: 32.7
Shore hardness A: 62
Tensile breaking strength: 79.8 kg./cm.$^2$
Elongation at break: 308%
Tear strength: 14.8 kg./cm.

I claim:
1. An organopolysiloxane composition convertible on curing to an elastomer, which composition comprises in parts by weight
    (a) 100 parts of an organopolysiloxane of viscosity $2 \times 10^6$ to $80 \times 10^6$ centipoises measured at 25° C., the organopolysiloxane being free from hydrogen atoms bonded directly to silicon atoms and being essentially formed by repetition of diorganosiloxy units, the organic radicals, which are bonded directly to the silicon atoms, being alkyl, alkenyl, aromatic hydrocarbon, haloalkyl, haloalkenyl or haloaromatic hydrocarbon radicals, the proportion by weight of aromatic radicals being at most 50% of all of the organic radicals and the proportion by weight of alkenyl groups being at most 2% of the weight of the organopolysiloxane rubber;
    (b) 5 to 100 parts of a finely divided silica,
    (c) 0.1 to 10 parts of an organic peroxide,
    (d) $10 \times 10^{-4}$ to $150 \times 10^{-4}$ parts of platinum in the form of a compound of platinum,
    (e) 0.5 to 10 parts of a pyrogenic titanium dioxide with an average particle diameter of less than 0.1 micron, and
    (f) 0.01 to 2 parts of metal oxide, which is zinc oxide (ZnO), aluminum oxide ($Al_2O_3$), magnesium oxide (MgO) or tin oxide ($SnO_2$).

2. A composition according to claim 1 which comprises in addition at least one adjuvant, which is a pigment, plasticiser or stabiliser.

3. A composition according to claim 1 wherein the organic radicals in the organopolysiloxane are methyl radicals or methyl radicals together with at least one of vinyl and phenyl radicals.

4. A composition according to claim 1, wherein the organopolysiloxane has a proportion of trifunctional mono-organosiloxy groups not greater than 0.1%.

5. A composition according to claim 1, wherein the zinc oxide, aluminum oxide, magnesium oxide or tin oxide has a particle size of less than 50$\mu$.

6. A composition according to claim 1, wherein the finely divided silica has been treated with an organo silicon compound.

7. A composition according to claim 1 wherein the organopolysiloxane is a dimethylpolysiloxane of viscosity about $20 \times 10^6$ cp. at 25° C., having about $7.2 \times 10^{-4}$ parts of vinyl radicals per part of polysiloxane and terminated by trimethylsiloxy radicals, the finely divided silica is pyrogenic silica which has been treated with octamethylcyclotetrasiloxane, the organic peroxide is 2,4-dichlorobenzoyl peroxide, and the platinum compound is chloroplatinic acid or a complex thereof with octyl alcohol, and further comprising a heat stabiliser and an $\alpha,\omega$-di(hydroxy)dimethylpolysiloxane oil of viscosity about 40 cp. at 25° C.

8. An elastomer obtained by curing a composition as claimed in claim 1.

9. An elastomer according to claim 8 which comprises in addition at least one adjuvant, which is a pigment, plasticiser or stabiliser.

10. An elastomer according to claim 8 wherein the organic radicals in the organopolysiloxane are methyl radicals or methyl radicals together with at least one of vinyl and phenyl radicals.

11. An elastomer according to claim 8 wherein the organopolysiloxane rubber has a proportion of trifunctional mono-organosiloxy groups not greater than 0.1%.

12. An elastomer according to claim 8 wherein the zinc oxide, aluminum oxide, magnesium oxide or tin oxide has a particle size of less than 50$\mu$.

13. An elastomer according to claim 8 wherein the finely divided silica has been treated with an organo silicon compound.

14. An elastomer obtained by curing a composition as claimed in claim 7.

References Cited

UNITED STATES PATENTS

| | | | |
|---|---|---|---|
| 3,539,530 | 11/1970 | Karstedt | 260—46.5 UA |
| 3,708,467 | 1/1973 | Smith, Jr. et al. | 260—45.7 R |
| 3,692,737 | 9/1972 | Laur | 260—46.5 G |

MELVYN I. MARQUIS, Primary Examiner

U.S. Cl. X.R.

260—37 SB, 45.7 R, 45.75 R, 45.75 K, 46.5 G